United States Patent [19]
Bonnasse et al.

[11] Patent Number: 5,916,612
[45] Date of Patent: Jun. 29, 1999

[54] PREPARATION OF GRANULAR FOOD PRODUCT FOR INSTANT FOOD PREPARATION

[75] Inventors: Sabine Gahot Bonnasse, Ependes; Josef Burri, Epalinges; Osvlado Geromini, Orbe; Ernst Heck, Vufflens-La-Ville; Ernst H. Reimerdes, Cully/Villette; Dhan Pal Sirohi, Pully, all of Switzerland

[73] Assignee: Nestec, S.A., Vevey, Switzerland

[21] Appl. No.: 08/798,293

[22] Filed: Feb. 7, 1997

[30] Foreign Application Priority Data

Feb. 7, 1996 [EP] European Pat. Off. ............. 96810080

[51] Int. Cl.$^6$ ...................................... A23P 1/02
[52] U.S. Cl. ............................ 426/96; 426/443; 426/601; 426/658; 426/661; 426/656; 426/657
[58] Field of Search ............................. 426/72, 656, 657, 426/658, 661, 443, 96, 457, 601

[56] References Cited

U.S. PATENT DOCUMENTS

| | | | |
|---|---|---|---|
| 3,142,569 | 7/1964 | Scheidegger | 99/1 |
| 3,810,765 | 5/1974 | Nagasawa et al. | 426/96 X |
| 4,532,146 | 7/1985 | Durand et al. | 426/580 |
| 4,578,274 | 3/1986 | Sugisawa et al. | 426/96 |
| 4,692,340 | 9/1987 | Grütte et al. | 426/72 |
| 4,855,157 | 8/1989 | Tashiro et al. | 426/96 X |
| 4,861,605 | 8/1989 | Moon et al. | 426/96 |
| 5,332,585 | 7/1994 | Odermatt et al. | 426/96 |
| 5,451,421 | 9/1995 | Tanihara et al. | 426/589 |
| 5,702,741 | 12/1997 | Reutimann | 426/96 X |

FOREIGN PATENT DOCUMENTS

| | | |
|---|---|---|
| 0509748 | 10/1992 | European Pat. Off. . |
| 1203715 | 2/1960 | France . |
| 1348948 | 5/1964 | France . |
| 248502 | 8/1987 | Germany . |

OTHER PUBLICATIONS

Derwent Publications, Ltd., Database Abstract WPI Accession No :88–000138/01, Abstract of Petzold, et al., German Patent Document No. P P 248502 (1987).

Derwent Publications Ltd., Database Abstract WPI Accession No. 87–002389/01; Abstract of Skokuhin Sangyo Extrusion, Japanese Patent Document No. JP–A–61–260837(1986); and.

Derwent Publication, Ltd., Database Abstract WPI Accession No. 73–209954/15, Abstract of Teijin Ltd., Japanese Patent Document No. JP–B–73–011031(1970).

*Primary Examiner*—Milton Cano
*Attorney, Agent, or Firm*—Vogt & O'Donnell, LLP

[57] ABSTRACT

A granular food product for preparation of instant foods is prepared by mixing an oil or fat with an edible carbohydrate and/or protein powder materials to obtain a first mixture, and then further edible carbohydrate and/or protein powder materials are mixed with the first mixture to obtain a second mixture which is powdery or dough-like and that mixture is formed into granules by moistening and particle-to-particle contacting, and then the granules are dried.

19 Claims, No Drawings

PREPARATION OF GRANULAR FOOD PRODUCT FOR INSTANT FOOD PREPARATION

BACKGROUND OF THE INVENTION

The present invention relates to production of a free flowing and instantly dispersible and/or soluble granular food product.

German Patent No. DD 248502 (Institut für Getreideverarbeitung) discloses a process for the production of instant sauces or soups in the form of granules by preparing a powdery or doughlike mixture of protein hydrolysate, meat or vegetable material, instant flour or semolina, salt, sugar and spices, granulating it with a press or with an extruder, fluidised bed coating the granules with oil, carbohydrates or gums and drying them.

Great Britain Patent Application No. 2131271 (Institut für Getreideverarbeitung) discloses a process for the production of a granulated food based on milk or other animal or vegetable proteins, carbohydrates, fats and minerals which comprises mixing powdery components in a fluidised bed and spraying a liquid mix of the remaining components into the powdery components, the powdery material being coated and agglomerated by the sprayed material and dried simultaneously in the fluidised bed.

U.S. Pat. No. 5,332,585 (Odermatt et al.) discloses a process for preparing a granular food product by mixing a molten fat with an amylaceous material, extruding the mixture in strands, cooling the strands, subdividing them into sections and projecting the sections through a grill to reduce them into granules.

U.S. Pat. No. 4,578,274 (Sugisawa et al.) discloses a process for preparing a granular curry product by mixing fat flakes with powdery materials, heating the mixture, agitating and cooling it.

French Pat. No. 1,203,715 (CARNATION) discloses a process for preparing an instant and easily dispersible soup by preparing a powdery mixture of all the ingredients and agglomerating it with water droplets and/or vapour in a tower.

French Pat. No. FR 1,348,948 (PROCTER & GAMBLE) discloses a process for preparing free flowing and easily dispersible confectionary food mixtures by agglomerating powdery food materials comprising flour, shortening and/or sugar with a liquid binding agent such as a concentrated sugar solution or a molten shortening in a tumbler or in a fluidised bed.

U.S. Pat. No. 3,142,569 (Scheidegger) discloses a process for preparing a powdered foodstuff in which fat is dispersed by grinding a mixture of foodstuff, fat and little water and drying.

SUMMARY OF THE INVENTION

The problem addressed by the present invention was to provide a novel and simple process for the production of a free flowing and instantly dispersible and/or soluble granular food product from carbohydrates, proteins, and oil or fats.

To this end, the process according to the present invention comprises mixing edible powdery carbohydrates and/or protein rich materials with lipids selected from the group of oils and fats further mixing the mixture thus obtained with further edible powdery carbohydrates and/or protein rich materials in order to obtain a powdery and/or doughlike mix, forming the mix into granules by moistening and particle to particle contacting, and drying.

The process according to the present invention indeed enables a free flowing granular food product to be produced from carbohydrates, proteins, and oil or fats which is instantly dispersible and/or soluble in warm or boiling water and which is thus suitable for the preparation of instant food in pap or liquid form.

The present process even surprisingly enables a granular food product to be produced from carbohydrates, proteins, and oil or fats which, if simply shaken together with warm or boiling water, instantly provides a stable emulsion although it has never been homogenised. As a matter of fact, to our best knowledge, up to now the preparation of a liquid infant product with a significant amount of fat would have needed a prehomogenisation step in order that the fat does not separate after reconstitution with water.

Another main advantage of the present invention may be seen in the fact that the total moisture content of the materials involved may be kept very low throughout the whole process.

DETAILED DESCRIPTION OF THE INVENTION

Throughout the present specification and claims the expression "stable emulsion" means that a fat phase is predominantly present in form of small globules homogeneously dispersed in a liquid phase without any phase separation being observed.

The present process may start from edible carbohydrate-containing and protein-containing materials, which terms, as used in the claims below, are intended to be inclusive of carbohydrates and protein materials, per se, and from oil or fats in form of the components of an animal or vegetable material, such as milk solids, cereal flour or soya flour, and/or in form of individual components, such as starch, polysaccharides, maltodextrines, saccharose, lactose, glucose, egg proteins, gluten, protein concentrates or protein isolates from milk, whey or soya, triglycerides of animal or vegetable origin, milk fat, palm oil, palm olein, coconut oil, or rape seed oil, for example.

Thus, it is possible to prepare a mix which comprises, in parts by weight, from 5 to 95 parts, preferably from 30 to 70 parts of carbohydrates, up to 40 parts, preferably from 15 to 30 parts of proteins, and up to 80 parts, preferably from 5 to 40 parts of oil or fats, for example.

The following components may be added before and/or after preparing said mix:

up to 25 parts, preferably up to 15 parts of water, more preferably an amount of water such that the total moisture content of the mix before drying is up to 11%, and most preferably an amount of water such that the total moisture content of the mix before drying is up to 7.5%, up to 5 parts, preferably up to 0.6 part of emulsifier, such as lecithin, mono- and/or diglycerides, up to 3 parts, preferably up to 1 part of stabilizers, such as pectine, xanthan and other gums, and, optionally, vitamins, micronutrients and/or antioxidants.

The step of mixing powdery carbohydrates and/or protein rich materials with an oil or fat preferably comprises mixing together in a mixer, such as e.g. a horizontal mixer with plow-shaped heads arranged on its horizontal shaft, a conical mixer with an orbiting helical screw or a bowl chopper, for about 5 to about 15 min at a temperature of from above about 45° C. to about 65° C.:

from 15 to 25 parts of oils, especially coconut oil, palm olein and/or soya bean oil, which have a clear melting point of between 30–45° C.,and from 15 to 25 parts of lactose, or from 10 to 20 parts of starch, or from 40 to 50 parts of skimmed milk powder.

The step of further mixing the mixture thus obtained with further powdery carbohydrates and/or protein rich materials in order to obtain a powdery and/or doughlike mix preferably comprises agitating said mixture in a mixer, such as e.g. a horizontal mixer with plow-shaped heads arranged on its horizontal shaft, a ribbon mixer, a pastry mixer or a bowl chopper, at a temperature of from about 45° C. to about 65° C. for up to 2 min, and progressively adding, while further agitating for about 5 to 15 min and while cooling the mixer with water at about room temperature:

skimmed milk powder, starch, especially cold swelling starch and/or lactose in respective amounts such that the total amount of each of these materials in the mix is from 40 to 50 parts for the skimmed milk powder, from 10 to 20 parts for the starch and from 15 to 25 parts for the lactose.

The mix obtained at this stage may have a texture intermediate between a powdery texture and the texture of a dough and suitable for being formed into granules as described further below. It may be said to be a thick powder which is not really free flowing, for example.

The step of forming the mix into granules by moistening and particle to particle contacting may be carried out with the aid of steam and/or an aqueous solution of a binder, especially of maltodextrin, gums or starch, in any adequate agglomerating and/or forming apparatus, preferably in an apparatus exerting a compressing and/or an agitating effect on the mix such as a dragee pan or a vertical agglomerator with knifes arranged around its vertical shaft rotating within a flexible rubber tube, or in case of use of a bowl chopper directly into it, or by sieve granulation, for example.

Remaining ingredients such as emulsifier, stabilizer, micronutrients and/or vitamins may be added during the forming step, for example.

The granules thus obtained may then be dried to a residual water content of between 1 to 5%, preferably between 2 to 3.5%. In case of use of a bowl chopper this drying step may be carried out by flashing which enables to also adjust the granules hardness.

These granules may have a bulk density of from about 400 g/l to about 600 g/l, for example.

They are instantly dispersible and/or soluble in warm or boiling water and they are suitable for the preparation of instant food in pap or liquid form.

Further forming steps such as compacting and or spheronising may be provided for, so that the bulk density of the granules be increased up to values between about 500 and 1000 g/l, for example.

An embodiment of the process according to the present invention is illustrated in the following Example in which percentages and parts are by weight.

EXAMPLE 19 parts of an oil composition containing equal amounts of coconut oil, palm olein and soya bean oil were mixed with 19 parts of lactose at 60° C. for 10 min in a conical mixer with an orbiting helical screw.

The mixture was agitated in a horizontal mixer with plow-shaped heads arranged on its horizontal shaft (LOEDIGE mixer) at 60° C. for 1 min and further mixed successively for 3 min with 14 parts cold swelling starch and for 7 min with 43 parts skimmed milk powder, while cooling the mixer with water at room temperature.

The powdery mix thus obtained had a moisture content of 3.5%. It had a texture intermediate between a powdery texture and the texture of a dough. It could be defined as a thick powder which was not really free flowing.

It was formed into granules with the aid of 7.5 parts of an aqueous solution of maltodextrin (40% water and 60% maltodextrin) in a vertical agglomerator with knifes arranged around its vertical shaft rotating within a flexible rubber tube (SCHUGI agglomerator).

The granules thus obtained had a moisture content of 6.2%. They were dried in a fluidised bed dryer to a residual moisture content of 3.1%.

The dried granules had a bulk density of 580 g/l. They were free flowing and instantly dispersible in warm or boiling water.

29 g of these granules simply shaken together with 158 ml warm water (50° C.) instantly provided a stable emulsion.

We claim:

1. A process for preparing a granular food product comprising the steps of:

mixing lipids selected from the group consisting of oils and fats with an edible powder material selected from the group consisting of carbohydrate-containing and protein-containing material powders thereof in a mixing device to prepare and obtain a first mixture, wherein the mixing device is selected from the group consisting of a horizontal mixer having a horizontal shaft and plow-shaped heads arranged on the shaft, of a conical mixer having an orbiting helical screw and of a bowl chopper;

mixing further edible powder material selected from the group consisting of carbohydrate-containing and protein-containing material powders with the first mixture in a mixing device to prepare and obtain a second mixture suitable for being formed into granules, wherein the mixing device is selected from the group consisting of a horizontal mixer having a horizontal shaft and plow-shaped heads arranged on the shaft, of a ribbon mixer, of a pastry mixer and of a bowl chopper;

moistening and causing particle-to-particle contact of the second mixture with a forming device to form the second mixture particles into granules, wherein the forming device is selected from the group consisting of a dragee pan, of a vertical agglomerator having a vertical shaft and knives arranged around the shaft and rotating within a flexible rubber tube, of a bowl chopper and of a granulation sieve; and drying the granules.

2. A process according to claim 1 wherein the first mixture is obtained by mixing, in parts by weight, from 5 parts to 95 parts carbohydrate-containing powder material and up to 40 parts protein-containing powder material and wherein the lipids are present an in an amount of up to 80 parts.

3. A process according to claim 2 further comprising adding to and mixing with the lipids and the powder material mixed for preparing the first mixture or adding to and mixing with the first mixture, in parts by weight:

water so that the water is present and in an amount of up to 25 parts;

up to 5 parts emulsifier; and up to 3 parts stabilizer.

4. A process according to claim 2 wherein the second mixture is prepared by mixing a starch and at least one substance of the group consisting of skimmed milk powder and lactose with the first mixture, in parts by weight based upon the weight of the second mixture, of from 10 parts to 20 parts starch, and when present, of from 40 parts to 50 parts skimmed milk powder and of from 15 parts to 25 parts lactose.

5. A process according to claim 4 wherein the starch is a cold-swelling starch.

6. A process according to claim 2 wherein the first mixture and the second mixture are prepared and the second mixture is moistened so that moisture is present in an amount by weight of up to 11%.

7. A process according to claim 1 wherein the first mixture is obtained by mixing, in parts by weight, from 30 parts to 70 parts carbohydrate-containing powder material, from 15 parts to 30 parts protein-containing powder material and from 5 parts to 40 parts lipids.

8. A process according to claim 7 further comprising adding to and mixing with the first mixture, in parts by weight:
water so that the water is present and in an amount of up to 15 parts;
up to 0.6 part emulsifiers;
up to 1 part stabilizer; and
at least one of vitamins, micronutrients and an antioxidant.

9. A process according to claim 7 wherein the first mixture and the second mixture are prepared and the second mixture is moistened so that moisture is present in the granules prior to drying and in an amount by weight of up to 11%.

10. A process according to claim 1 wherein the first mixture and the second mixture are prepared and the second mixture is moistened so that moisture is present in the granules prior to drying and in an amount by weight of up to 11%.

11. A process according to claim 1 wherein the granules are dried to a moisture content by weight of between 1% and 5%.

12. A process according to claim 1 wherein the granules are dried to a moisture content by weight of between 2% and 3.5%.

13. A process according to claim 1 wherein the second mixture is moistened with steam.

14. A process according to claim 1 wherein the second mixture is moistened with an aqueous solution comprising a binder material.

15. A process according to claim 1 wherein the second mixture is moistened with an aqueous solution comprising a substance selected for the group consisting of maltodextrin, a gum and a starch.

16. A process according to claim 15 wherein the forming device is the vertical agglomerator.

17. A process according to claim 16 wherein the mixing device to prepare the first mixture is the conical mixer and the mixing device to prepare the second mixture is the horizontal mixer.

18. A process according to claim 1 wherein the forming device is the vertical agglomerator.

19. A process according to claim 18 wherein the mixing device for preparing the first mixture is the conical mixer and the mixing device to prepare the second mixture is the horizontal mixer.

* * * * *

UNITED STATES PATENT AND TRADEMARK OFFICE
CERTIFICATE OF CORRECTION

PATENT NO. : 5,916,612
DATED : June 29, 1999
INVENTOR(S) : Sabine Bonnasse Gahot, et. al.

It is certified that error appears in the above-indentified patent and that said Letters Patent is hereby corrected as shown below:

Title page, item [19] delete Bonnasse et al. and insert therefor-- Gahot et. al.--

Title page, item [75], inventors, change Gahot Bonnasse to -- Bonnasse Gahot --.

Column 4, line 54/55 (line 5 of claim 2) delete the first occurrence of "an" and insert therefor -- and --.

Signed and Sealed this

Sixteenth Day of November, 1999

Attest:

Q. TODD DICKINSON

*Attesting Officer*

*Acting Commissioner of Patents and Trademarks*